US012360329B2

(12) United States Patent
Hu et al.

(10) Patent No.: US 12,360,329 B2
(45) Date of Patent: Jul. 15, 2025

(54) OPTICAL SYSTEM

(71) Applicant: TDK TAIWAN CORP., Taoyuan (TW)

(72) Inventors: Chao-Chang Hu, Taoyuan (TW); Che-Wei Chang, Taoyuan (TW); Chih-Wen Chiang, Taoyuan (TW); Chen-Er Hsu, Taoyuan (TW); Fu-Yuan Wu, Taoyuan (TW); Shou-Jen Liu, Taoyuan (TW); Chih-Wei Weng, Taoyuan (TW); Mao-Kuo Hsu, Taoyuan (TW); Hsueh-Ju Lu, Taoyuan (TW); Che-Hsiang Chiu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 619 days.

(21) Appl. No.: 16/729,111

(22) Filed: Dec. 27, 2019

(65) Prior Publication Data

US 2021/0191067 A1 Jun. 24, 2021

(30) Foreign Application Priority Data

Dec. 20, 2019 (EP) ..................................... 19218902

(51) Int. Cl.
*G02B 7/09* (2021.01)
*G02B 3/00* (2006.01)
(Continued)

(52) U.S. Cl.
CPC ................. *G02B 7/09* (2013.01); *G02B 3/00* (2013.01); *G02B 3/12* (2013.01); *G02B 7/04* (2013.01);
(Continued)

(58) Field of Classification Search
CPC ... G02B 7/09; G02B 3/00; G02B 3/12; G02B 7/04; G02B 26/004; G02B 27/646;
(Continued)

(56) References Cited

U.S. PATENT DOCUMENTS

2010/0232161 A1* 9/2010 Aschwanden ........... G02B 3/14
359/666
2013/0343740 A1* 12/2013 Calvet .................... G03B 13/34
359/823

(Continued)

*Primary Examiner* — Pinping Sun
*Assistant Examiner* — Gabriel A Sanz
(74) *Attorney, Agent, or Firm* — MUNCY, GEISSLER, OLDS & LOWE, P.C.

(57) ABSTRACT

An optical system is provided and includes a fixed assembly, a movable element, a movable assembly, and a driving module. The fixed assembly defines a main axis, and the fixed assembly has a casing on which a casing opening is formed, corresponding to the main axis. The movable element is movable relative to the fixed assembly and is connected to a first optical element. The movable assembly is connected to the movable element. The driving module is configured to drive the movable assembly so as to drive the movable element to move relative to the fixed assembly. The first optical element has a first section and a second section. When viewed along the main axis, the size of the first section is larger than the size of the casing opening, and the size of the second section is smaller than the size of the casing opening.

19 Claims, 16 Drawing Sheets

(51) Int. Cl.
    *G02B 3/12*      (2006.01)
    *G02B 7/04*      (2021.01)
    *G02B 26/00*     (2006.01)
    *G02B 27/64*     (2006.01)
    *G03B 5/00*      (2021.01)
    *G03B 13/36*     (2021.01)
    *H04N 23/55*     (2023.01)
    *H04N 23/68*     (2023.01)

(52) U.S. Cl.
    CPC ......... *G02B 26/004* (2013.01); *G02B 27/646* (2013.01); *G03B 5/00* (2013.01); *G03B 13/36* (2013.01); *H04N 23/55* (2023.01); *H04N 23/681* (2023.01); *G03B 2205/0007* (2013.01); *G03B 2205/0053* (2013.01); *G03B 2205/0069* (2013.01)

(58) Field of Classification Search
    CPC ........ G02B 3/14; G02B 13/0075; G03B 5/00; G03B 13/36; G03B 2205/0007; G03B 2205/0053; G03B 2205/0069; H04N 5/2254; H04N 5/23251
    See application file for complete search history.

(56)        References Cited

U.S. PATENT DOCUMENTS

| | | | |
|---|---|---|---|
| 2014/0009631 A1* | 1/2014  | Topliss  | H04N 5/2257 348/208.11 |
| 2015/0215542 A1* | 7/2015  | Nomura   | G02B 13/0065 348/208.11 |
| 2015/0226978 A1* | 8/2015  | Sugawara | H04N 5/23258 359/557 |
| 2016/0202446 A1* | 7/2016  | Cheng    | H02K 41/0354 359/557 |
| 2017/0003517 A1* | 1/2017  | Sue      | G02B 27/646 |
| 2017/0052386 A1* | 2/2017  | Siegrist | G02B 7/023 |
| 2018/0129118 A1* | 5/2018  | Sue      | G02B 27/646 |
| 2018/0364446 A1* | 12/2018 | Osaka    | G02B 7/08 |
| 2020/0292841 A1* | 9/2020  | Sakae    | H04N 23/00 |

* cited by examiner

OPTICAL SYSTEM

CROSS REFERENCE TO RELATED APPLICATIONS

This application claims the benefit of U.S. Provisional Application No. 62/785,593, filed Dec. 27, 2018, and European Patent Application No. 19218902.5, filed Dec. 20, 2019, the entirety of which are incorporated by reference herein.

BACKGROUND OF THE DISCLOSURE

Field of the Disclosure

The present disclosure relates to an optical system, and in particular it relates to an optical system having a liquid lens.

Description of the Related Art

As technology has progressed, many kinds of electronic devices such as smartphones have begun to include the functionality of digital photography or video recording. A user can operate the electronic device to capture various images with a camera module that is included in the electronic device.

Today's design of electronic devices continues to move toward the trend of miniaturization so that the various components of the camera module or its structure must also be continuously reduced, so as to achieve the purpose of miniaturization. In general, a driving mechanism of the camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of miniaturization.

Therefore, how to design a camera module that can perform autofocus, optical image stabilization, and miniaturization at the same time is a topic nowadays that needs to be discussed and solved.

BRIEF SUMMARY OF THE DISCLOSURE

Accordingly, one objective of the present disclosure is to provide an optical system (a camera module) to solve the above problems.

According to some embodiments of the disclosure, an optical system is provided and includes a fixed assembly, a movable element, a movable assembly, and a driving module. The fixed assembly defines a main axis, and the fixed assembly has a casing on which a casing opening is formed, corresponding to the main axis. The movable element is movable relative to the fixed assembly and is connected to a first optical element. The movable assembly is connected to the movable element. The driving module is configured to drive the movable assembly so as to drive the movable element to move relative to the fixed assembly. The first optical element has a first section and a second section. When viewed along the main axis, the size of the first section is larger than the size of the casing opening, and the size of the second section is smaller than the size of the casing opening.

According to some embodiments, the driving module includes a driving magnet and a magnetically permeable element, and an area of the magnetically permeable element is larger than an area of the driving magnet.

According to some embodiments, the fixed assembly includes a frame, a groove corresponding to the magnetically permeable element is formed on the frame, and when viewed along the main axis, the groove partially overlaps the magnetically permeable element.

According to some embodiments, the driving magnet has an inclined surface, and a stopping slope is formed on the frame configured to block the driving magnet.

According to some embodiments, the groove has a first accommodating portion and a second accommodating portion, and there is a step between the first accommodating portion and the second accommodation portion.

According to some embodiments, a first adhesive element is disposed in the first accommodating portion, a second adhesive element is disposed in the second accommodating portion, and the first adhesive element and the second adhesive element include different materials.

According to some embodiments, the driving module further includes a driving coil disposed on the movable assembly, an accommodating recess is formed between the driving coil and the movable assembly, and the optical system further includes an electronic component which is disposed in the accommodating recess.

According to some embodiments, the casing has a first top surface which contacts the first optical element, and when viewed along the main axis, the first top surface does not overlap the driving module.

According to some embodiments, the optical system further includes a second optical element, and when viewed along the main axis, an effective optical area of the first optical element is larger than an effective optical area of the second optical element.

According to some embodiments, the movable assembly has a plane and a curved surface which face the main axis.

According to some embodiments, the driving module includes a circuit board having a plate-shaped structure, the circuit board includes a coil and a circuit line, and when viewed in a direction of the circuit board, the coil partially overlaps the circuit line.

According to some embodiments, when viewed in a direction perpendicular to the circuit board, the coil surrounds a first portion of the circuit line.

According to some embodiments, the circuit board includes a first layer and a second layer, a portion of the coil is disposed on the second layer, and the first portion of the circuit line is disposed on the second layer.

According to some embodiments, a second portion of the circuit line is disposed on the first layer, and when viewed in a direction of the first layer, the circuit line does not overlap the coil.

According to some embodiments, the circuit board further includes a third layer, a portion of the coil is disposed on the third layer, and when viewed in a direction of the third layer, the coil does not overlap the circuit line.

According to some embodiments, when viewed in the direction perpendicular to the circuit board, the coil partially overlaps the circuit line.

According to some embodiments, the circuit board further includes an insulating layer formed between the first layer and the second layer, and the insulating layer is in direct contact with the first layer and the second layer.

According to some embodiments, the casing opening is located on a first top surface of the casing, the first top surface is not parallel to the main axis, when viewed along the main axis, the first top surface at least partially overlaps a connecting assembly, and the movable element is connected to the movable assembly by the connecting assembly.

According to some embodiments, the optical system further includes an elastic element, when viewed along the main axis, the elastic element is located in a plurality of corners of the casing having a polygonal structure, and the connecting assembly includes a plurality of connecting members which are respectively distributed between the corners.

According to some embodiments, the optical system further includes an elastic element, when viewed along the main axis, the elastic element is located at a plurality of sides of the casing having a polygonal structure, and the connecting assembly includes a plurality of connecting members which are distributed in the respective corners of the casing.

According to some embodiments, the fixed assembly further includes a base, the casing further includes a first top surface and a second top surface, the first top surface and the second top surface are not parallel to the main axis, the first top surface and the second top surface both are back to the base, and a shortest distance between the second top surface and the base is smaller than a shortest distance between the first top surface and the base.

According to some embodiments, the optical system further includes an elastic element, a movable assembly surface of the movable assembly is movable connected to the fixed assembly through the elastic element, and a distance between the first top surface and the second top surface along the main axis is shorter than a distance between the movable assembly surface and the first top surface.

The present disclosure provides an optical system having a first optical element, a deforming member, a movable element, a fixed assembly, a connecting assembly, a movable assembly, and a driving module. The movable element is configured to be connected to the first optical element through the deforming member, and the movable assembly is connected to the movable element through the connecting assembly. When driving module is configured to drive movable assembly to move relative to fixed assembly, the movable element can be moved to drive the deforming member to push the bottom of first optical element, thereby changing the optical properties of the liquid lens element.

In addition, in some embodiments, the magnetic element is disposed in the groove of the frame. A stopping slope is formed on the frame. The stopping slope is configured to block the inclined surface of the magnetic element for preventing the magnetic element from colliding with the corresponding driving coil and causing the driving coil to be damaged. The groove can have a first accommodating portion and a second accommodating portion, and a first adhesive element and a second adhesive element can be respectively disposed in the first accommodating portion and the second accommodating portion so as to adhere the third magnetic element and the magnetically permeable element to the frame. In addition, the aforementioned first adhesive element and the second adhesive element include different materials.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
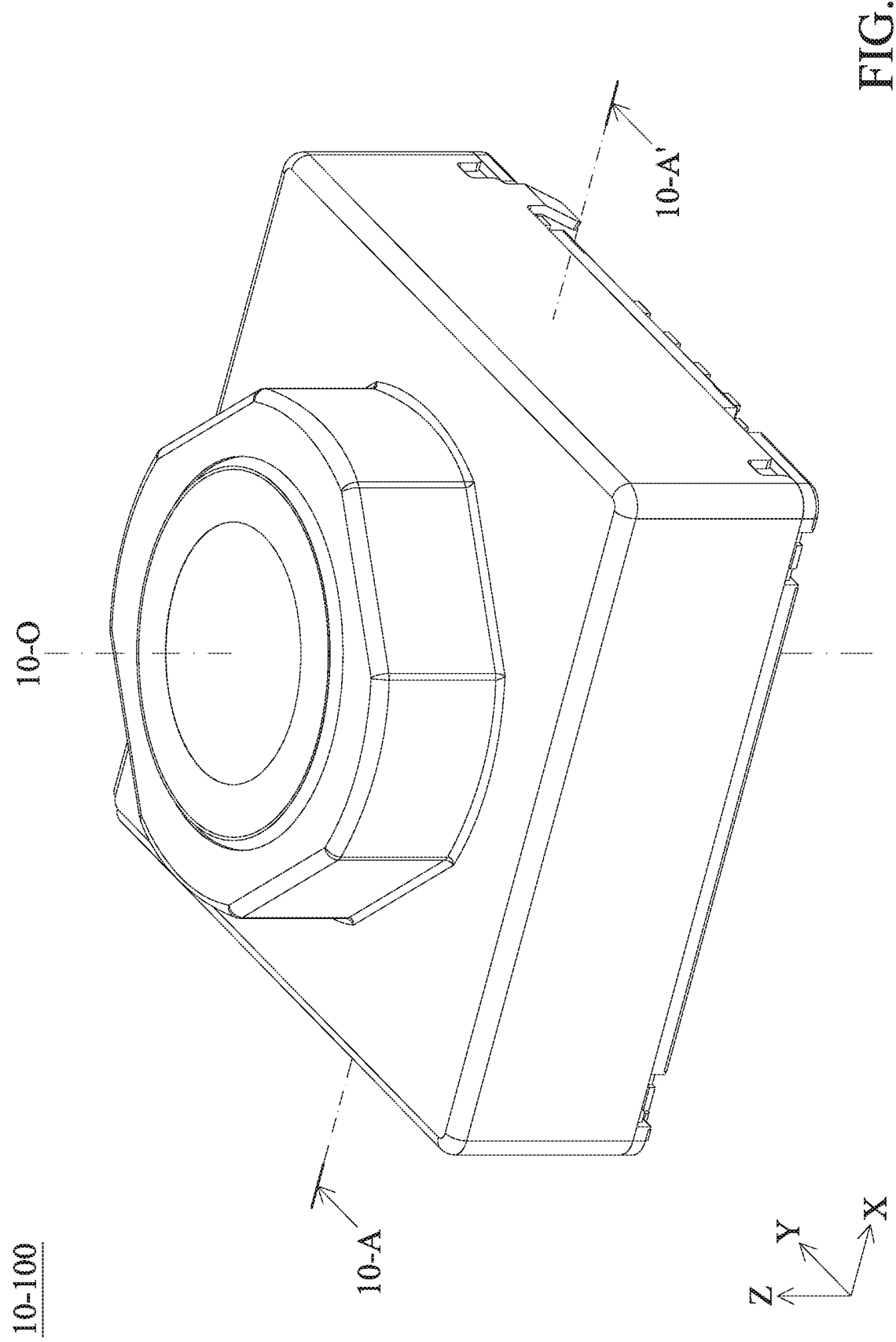
FIG. 1 is a schematic diagram of an optical system 10-100 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
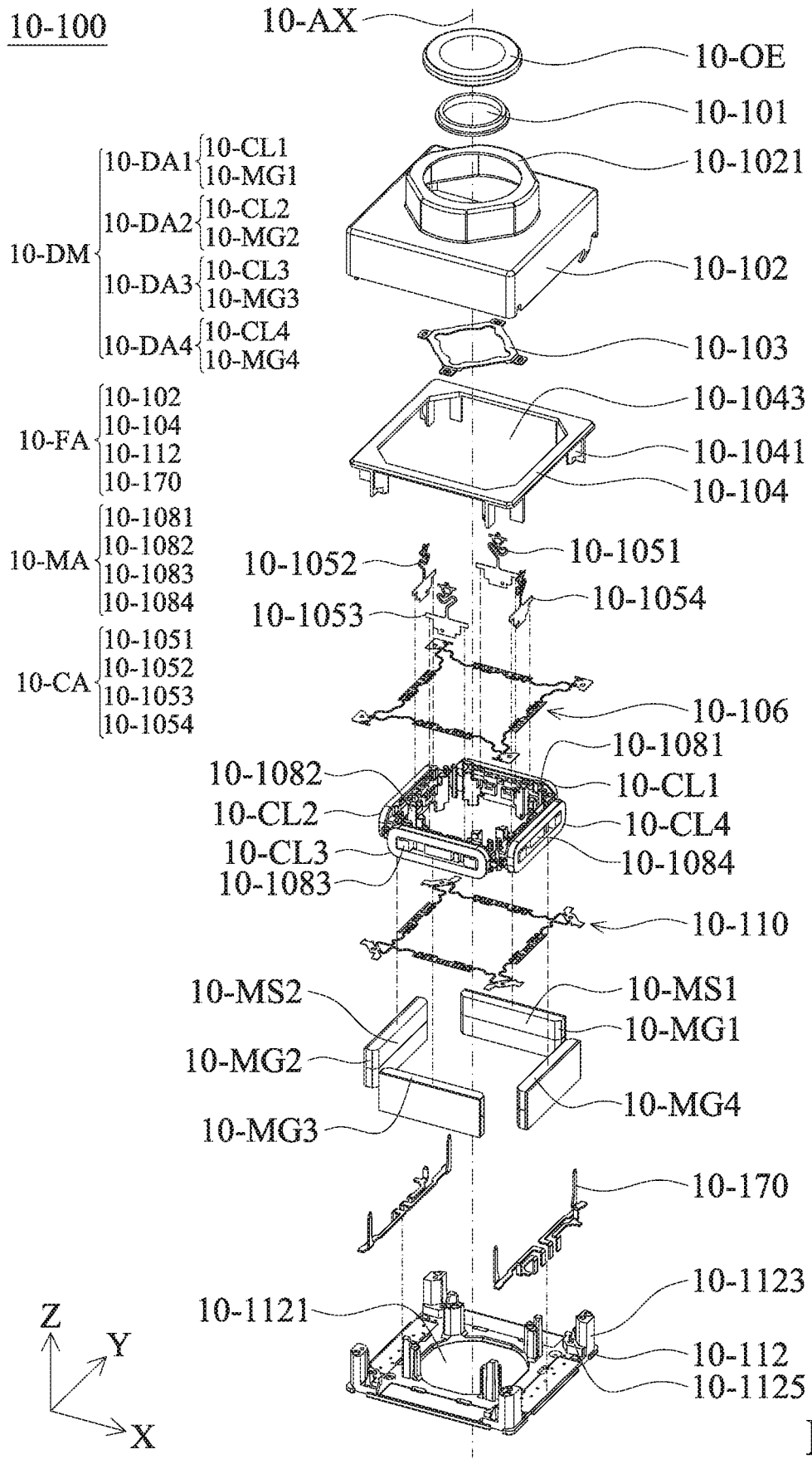
FIG. 2 is an exploded diagram of an optical system 10-100 according to an embodiment of the present disclosure.
Figure 3:
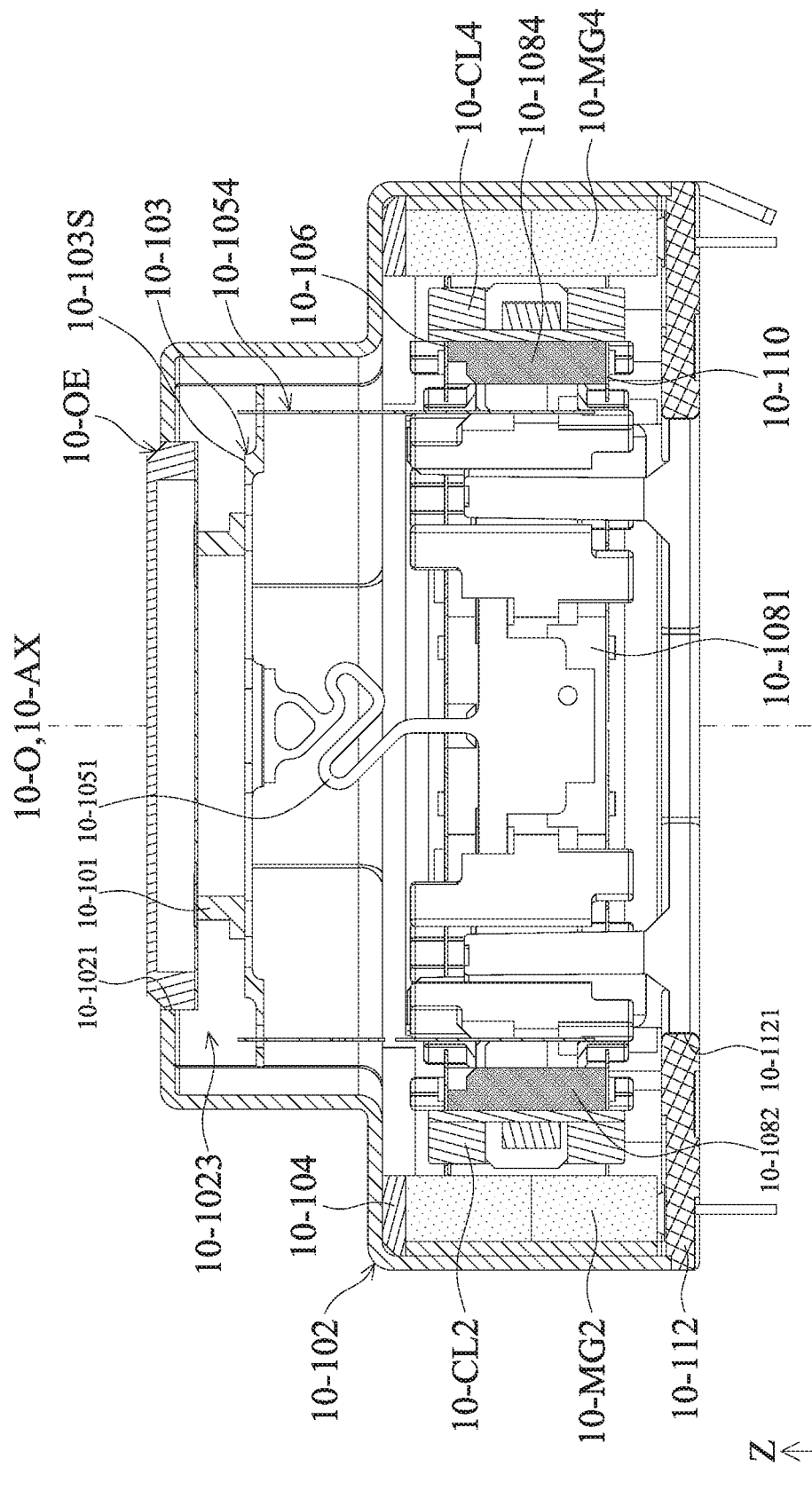
FIG. 3 is a cross-sectional view of the optical system 10-100 along line (10-A)-(10-A') in FIG. 1 according to an embodiment of the present disclosure.

Please refer to FIG. 1 to FIG. 3. FIG. 1 is a schematic diagram of an optical system 10-100 according to an embodiment of the present disclosure, FIG. 2 is an exploded diagram of an optical system 10-100 according to an embodiment of the present disclosure, and FIG. 3 is a cross-sectional view of the optical system 10-100 along line (10-A)-(10-A') in FIG. 1 according to an embodiment of the present disclosure. The optical system 10-100 can be an optical camera system and can be configured to hold and drive a first optical element 10-OE, and the first optical element 10-OE may define an optical axis 10-O. The optical system 10-100 can be installed in different electronic devices or portable electronic devices, such as a smartphone, for allowing a user to perform the image capturing function. In this embodiment, the optical system 10-100 can be a voice coil motor (VCM) with an auto-focusing (AF) function, but it is not limited thereto. In other embodiments, the optical system 10-100 can also perform the functions of auto-focusing and optical image stabilization (OIS).

As shown in FIG. 2, in this embodiment, the optical system 10-100 may include a fixed assembly 10-FA, a deforming member 10-101, a movable element 10-103, and a connecting assembly 10-CA, a movable assembly 10-MA and a driving module 10-DM. The deforming member 10-101 is connected between the movable element 10-103 and the first optical element 10-OE, the movable element 10-103 is movable relative to the fixed assembly 10-FA, and the driving module 10-DM is configured to drive the movable element 10-103 to move relative to the fixed assembly 10-FA. Specifically, the movable assembly 10-MA is movably connected to the movable element 10-103 via the connecting assembly 10-CA, and the driving module 10-DM drives the movable assembly 10-MA to move relative to the fixed assembly 10-FA, thereby driving the movable element 10-103.

In this embodiment, as shown in FIG. 2 and FIG. 3, the fixed assembly 10-FA includes a casing 10-102, a frame 10-104, and a base 10-112. The casing 10-102 is fixedly connected to the base 10-112, and the frame 10-104 can also be fixedly connected to the inner wall surface of the casing 10-102. A main axis 10-AX can be defined by the fixed assembly 10-FA. When the optical system 10-100 is not activated, the main axis 10-AX is parallel to or overlaps an optical axis 10-O of the first optical element 10-OE. In addition, the movable element 10-103 has a movable element surface 10-103S which faces the first optical element 10-OE.

As shown in FIG. 2 and FIG. 3, the aforementioned casing 10-102 has a hollow structure, and a casing opening 10-1021 is formed thereon. A base opening 10-1121 is formed on the base 10-112, The center of the casing opening 10-1021 corresponds to the optical axis 10-O of the first optical element 10-OE, and the base opening 10-1121 corresponds to a photosensitive element (not shown in the figure) disposed below the base 10-112. In this embodiment, the first optical element 10-OE is fixedly disposed in the casing opening 10-1021. The external light can enter the casing 10-102 through the first optical element 10-OE and then is received by the aforementioned photosensitive element after passing through the base opening 10-1121 so as to generate a digital image signal.

Furthermore, the casing 10-102 is disposed on the base 10-112 and may have an accommodating space 10-1023 configured to accommodate the movable element 10-103, the frame 10-104, and the movable assembly 10-MA, the connecting assembly 10-CA, and the driving module 10-DM.

As shown in FIG. 2 and FIG. 3, in this embodiment, the movable assembly 10-MA may include four movable members (a first movable member 10-1081, a second movable member 10-1082, and a third movable member 10-1083 and a fourth movable member 10-1084), and the connecting assembly 10-CA may include four connecting members (a first connecting member 10-1051, a second connecting member 10-1052, a third connecting member 10-1053, and a fourth connecting member 10-1054). The first movable member 10-1081 to the fourth movable member 10-1084 are connected to the movable element 10-103 by the first connecting member 10-1051 to the fourth connecting member 10-1054, respectively.

In addition, the optical system 10-100 may further include a first elastic element 10-106 and a second elastic element 10-110, and the base 10-112 may include four protruding columns 10-1123. The outer portion (the outer ring portion) of the first elastic element 10-106 is fixedly disposed on the top surfaces of the protruding columns 10-1123, the outer portion (the outer ring portion) of the second elastic element 10-110 is fixedly disposed on a plane 10-1125 of each of the protruding columns 10-1123, and the inner portions (the inner ring portions) of the first elastic element 10-106 and the second elastic element 10-110 are respectively connected to the upper and lower sides of the movable assembly 10-MA so that the first movable member 10-1081 to the fourth movable member 10-1084 are suspended in the accommodating space 10-1023.

In this embodiment, the driving module 10-DM may include four driving assemblies (a first driving assembly 10-DA1, a second driving assembly 10-DA2, a third driving assembly 10-DA3, and a fourth driving assembly 10-DA4). The first driving assembly 10-DA1 includes a first driving coil 10-CL1 and a first magnetic element 10-MG1, and the second driving assembly 10-DA2 includes a second driving coil 10-CL2 and a second magnetic element 10-MG2, the third driving assembly 10-DA3 includes a third driving coil 10-CL3 and a third magnetic element 10-MG3, and the fourth driving assembly 10-DA4 includes a fourth driving coil 10-CL4 and a fourth magnetic element 10-MG4.

In this embodiment, each magnetic element has a magnetic surface. For example, as shown in FIG. 2, the first magnetic element 10-MG1 and the second magnetic element 10-MG2 respectively have a first magnetic surface 10-MS1 and a second magnetic surface 10-MS2, the first magnetic surface 10-MS1 faces the first driving coil 10-CL1, the second magnetic surface 10-MS2 faces the second driving coil 10-CL2, and the first magnetic surface 10-MS1 and the second magnetic surface 10-MS2 face different directions.

In this embodiment, as shown in FIG. 2, the frame 10-104 has a plurality of grooves 10-1041 and a central opening 10-1043. In this embodiment, the frame 10-104 has four grooves 10-1041 configured to receive the four magnetic elements, but the number of the grooves 10-1041 and the magnetic elements is not limited to this embodiment. The central opening 10-1043 is configured to accommodate the first driving coil 10-CL1 to the fourth driving coil 10-CL4 and the first movable member 10-1081 to the fourth movable member 10-1084.

In this embodiment, the first driving coil 10-CL1 to the fourth driving coil 10-CL4 may be winding coils, which are respectively disposed on the first movable member 10-1081 to the fourth movable member 10-1084, and when the first driving coil 10-CL1 to the fourth driving coil 10-CL4 are provided with electricity, they can respectively act with the first magnetic element 10-MG1 to the fourth magnetic element 10-MG4 to generate an electromagnetic driving force to drive at least one of the first movable member 10-1081 to the fourth movable member 10-1084 to move relative to the base 10-112 and the frame 10-104 along the optical axis 10-O (the Z-axis) so as to perform the functions of auto focusing or optical image stabilization.

The driving assembly of the driving module 10-DM can actuate individually or cooperatively. For example, the first driving assembly 10-DA1 is configured to drive the first movable member 10-1081 to move relative to the fixed assembly 10-FA, and the second driving assembly 10-DA2 is configured to drive the second movable member 10-1082 to move relative to the fixed assembly 10-FA and the first movable member 10-1081, and so on.

Furthermore, as shown in FIG. 2, in this embodiment, the fixed assembly 10-FA may further include at least one circuit member 10-170 configured to be electrically connected to the driving module 10-DM through the first elastic element 10-106 or the second elastic element 10-110. The circuit member 10-170 may be implemented by insert molding technology, but it is not limited thereto.

Figure 4:
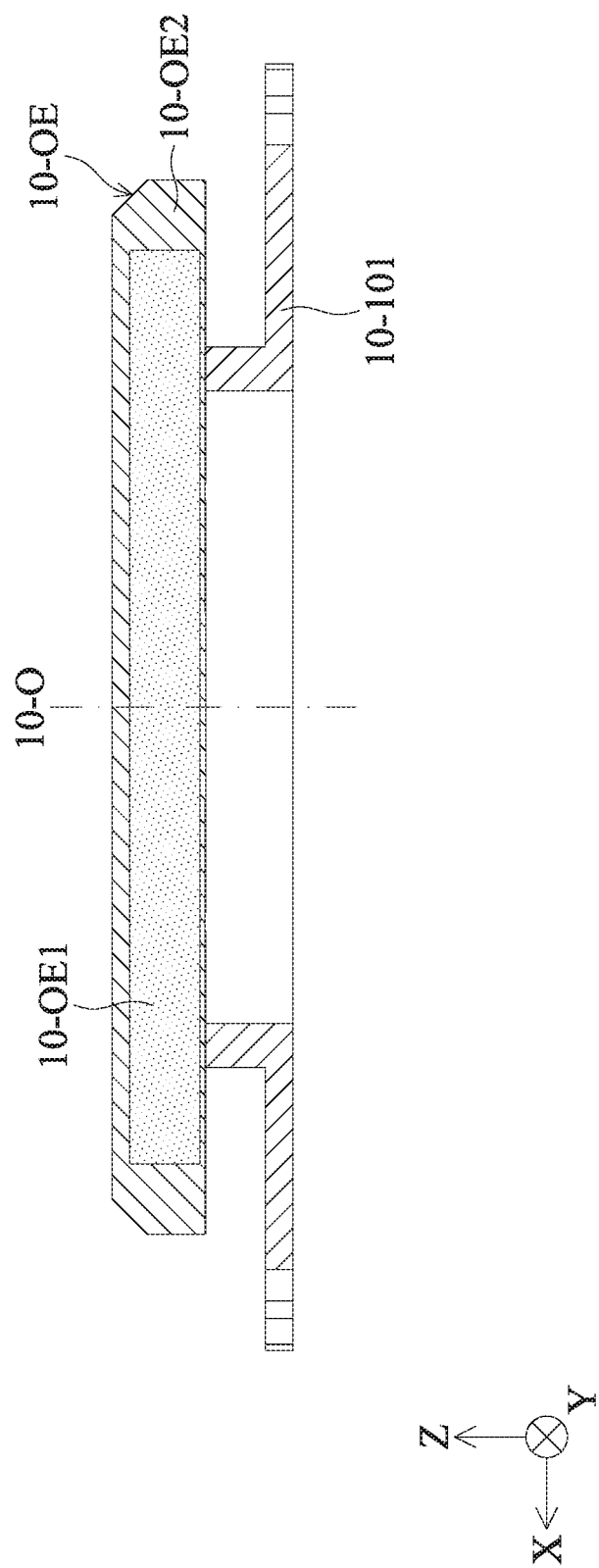
FIG. 4 is a schematic diagram illustrating that the first optical element 10-OE is not pushed by the deforming member 10-101 according to an embodiment of the present disclosure.
Figure 5:
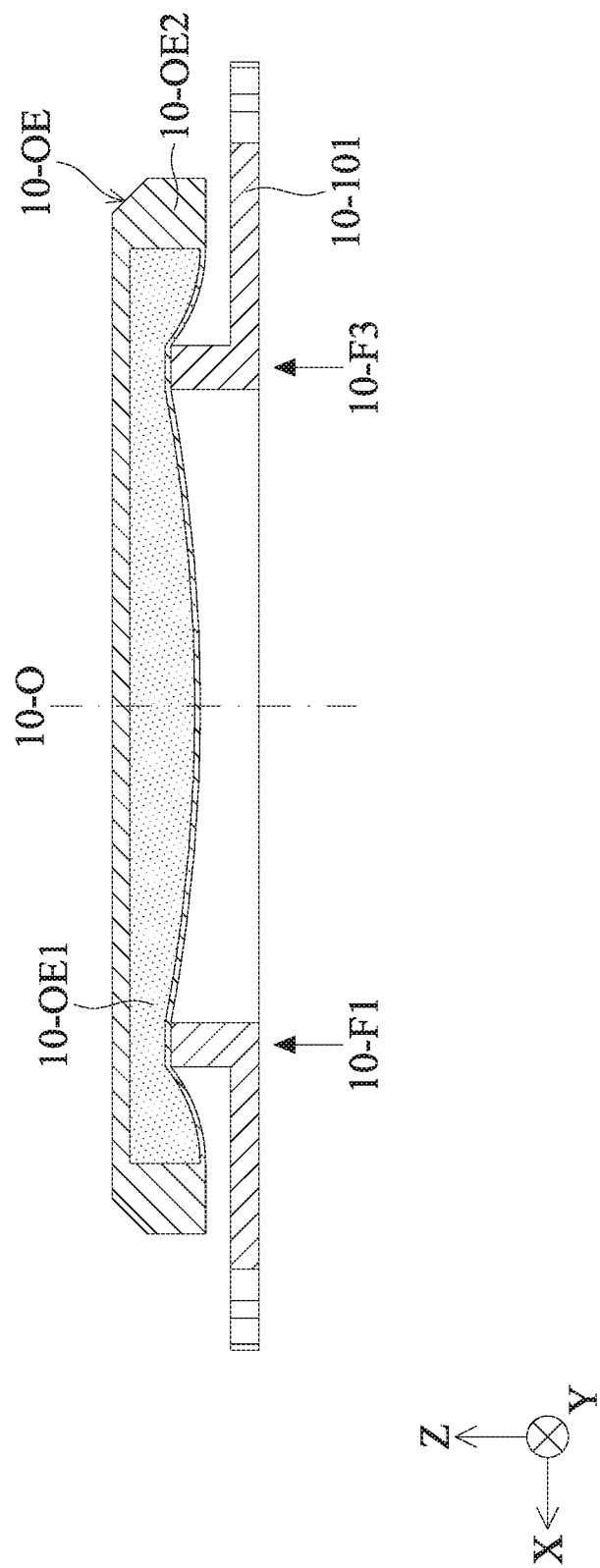
FIG. 5 and FIG. 6 are schematic diagrams of the first optical element 10-OE after being pushed by the deforming member 10-101 according to an embodiment of the present disclosure.
Figure 6:
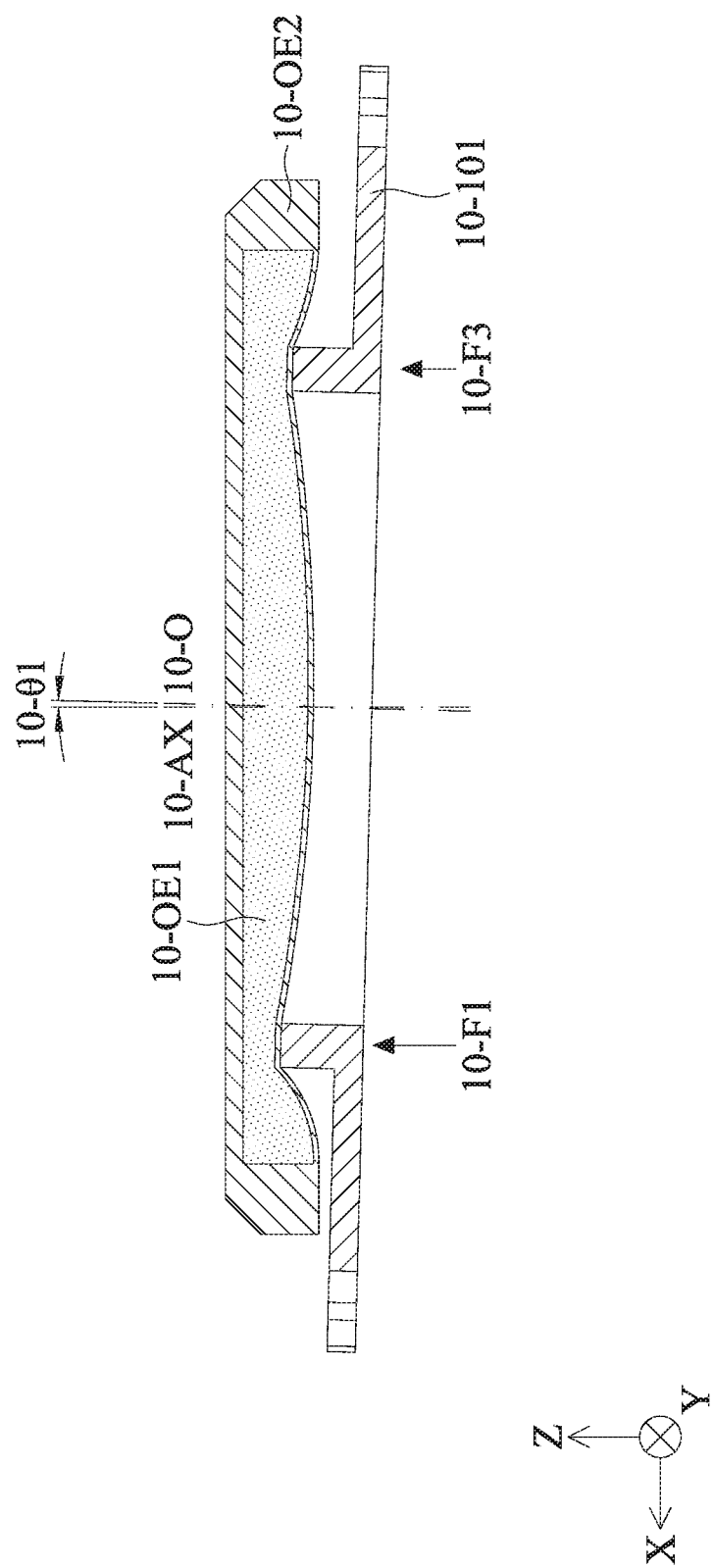

Next, please refer to FIG. 4 to FIG. 6. FIG. 4 is a schematic diagram illustrating that the first optical element 10-OE is not pushed by the deforming member 10-101 according to an embodiment of the present disclosure, and FIG. 5 and FIG. 6 are schematic diagrams of the first optical element 10-OE after being pushed by the deforming member 10-101 according to an embodiment of the present disclosure. As shown in FIG. 4, the first optical element 10-OE may be a liquid lens, including a liquid lens element 10-OE1 and a fixed member 10-OE2. The liquid lens element 10-OE1 is disposed within of the fixed member 10-OE2 having a hollow structure that protects and supports the liquid lens element 10-OE1. The deforming member 10-101 is disposed under the liquid lens element 10-OE1 and the fixed member 10-OE2. The bottom of the fixed member 10-OE2 may be a thin film, so that the deforming member 10-101 may be used for changing the shape of the liquid lens element 10-OE1.

FIG. 4 shows that the liquid lens element 10-OE1 is not deformed and the deforming member 10-101 is in an initial position, and the liquid lens element 10-OE1 has an optical axis 10-O. When the driving module 10-DM drives the movable assembly 10-MA to move, for example, applying a driving current to the driving coils of the driving module 10-DM, a magnetic force is generated between the driving coils and the corresponding magnetic elements, so that the movable assembly 10-MA is driven to move through the magnetic force and to force the deforming member 10-101 though the connecting assembly 10-CA to press the lower side of the liquid lens element 10-OE1. Therefore the liquid lens element 10-OE1 is deformed.

As shown in FIG. 2 and FIG. 5, when the first driving assembly 10-DA1 and the third driving assembly 10-DA3 of the driving module 10-DM provide pushing forces 10-F1, 10-F3 of the same magnitude, the deforming member 10-101 translates along the optical axis 10-O. At this time, the lens curvature of the liquid lens element 10-OE1 is changed from the curvature of the liquid lens element 10-OE1 in FIG. 4. That is, the shape of the liquid lens element 10-OE1 is changed. Therefore, the optical properties of the liquid lens element 10-OE1 can be changed, thereby achieving an optical zoom, focus or shock-proofing effect.

Similarly, referring to FIG. 6, when the driving module 10-DM drives the deforming member 10-101 with a tilted movement, as illustrated in FIG. 6, the deforming member 10-101 obliquely moves and provides an unequal amount of pushing forces 10-F1 and 10-F3 to two different sides of the liquid lens element 10-OE1, so that the optical axis 10-O of the liquid lens element 10-OE1 is rotated and is deviated from the main axis 10-AX. That is, there is an angle 10-O1 formed between them. Therefore, the optical properties of the liquid lens element 10-OE1 are changed, and the optical zoom, focusing or shock-proofing effect can be accomplished.

Figure 7:
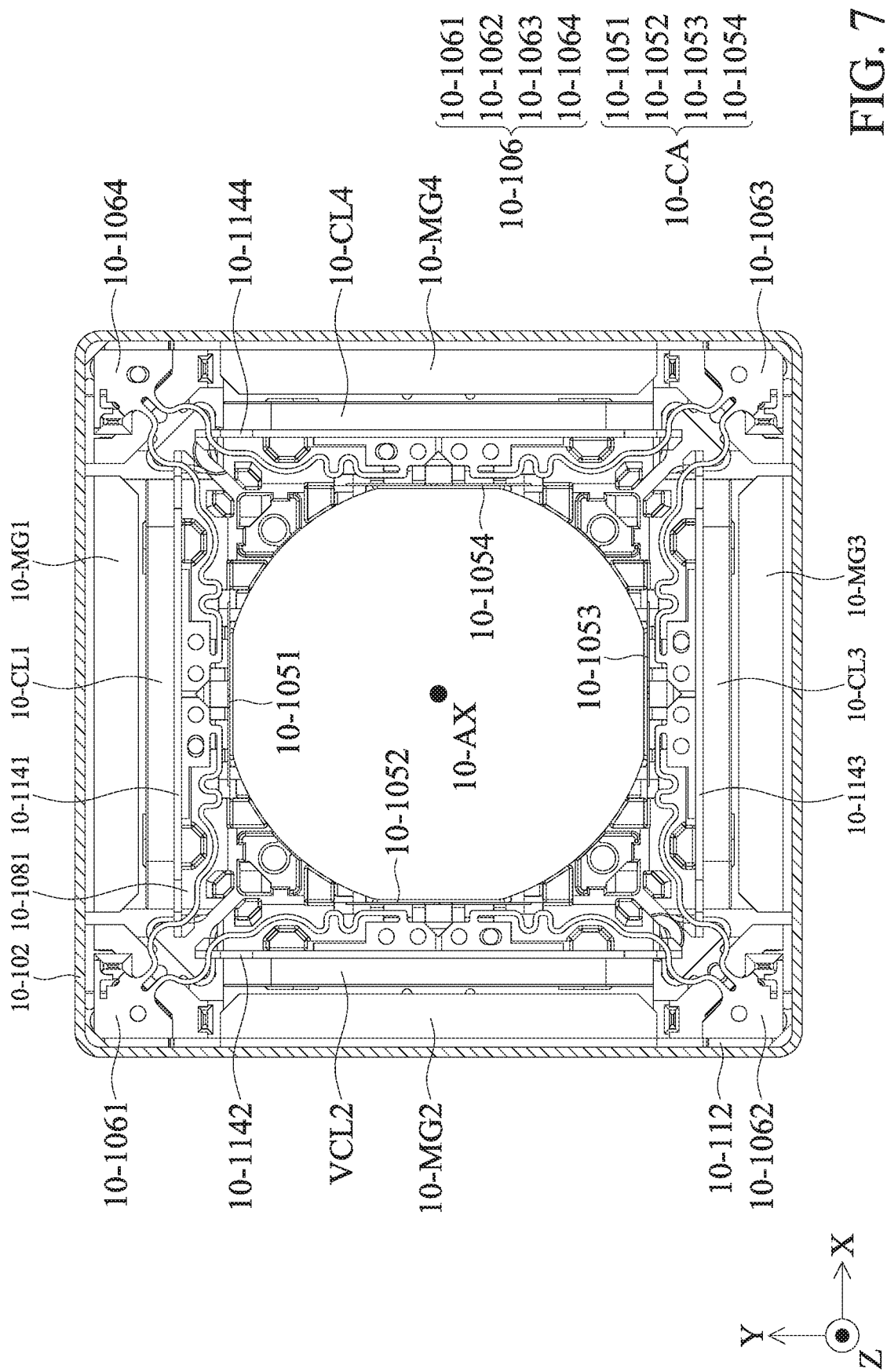
FIG. 7 is a top view of a partial structure of the optical system 10-100 according to an embodiment of the present disclosure.

Please refer to FIG. 7, which is a top view of a partial structure of the optical system 10-100 according to an embodiment of the present disclosure. When viewed along the main axis 10-AX, the first elastic element 10-106 is located in a plurality of corners of the polygonal casing 10-102, and the plurality of connecting members of the connecting assembly 10-CA are evenly distributed between these corners, respectively. For example, as shown in FIG. 7, the first elastic element 10-106 may include four conductive elements 10-1061 to 10-1064, which are respectively connected to portions of the base 10-112 located at the four corners of the casing 10-102, and the second connecting member 10-1052 is located between the conductive element 10-1061 and the conductive element 10-1062.

The arrangement of the first elastic element 10-106 and the connecting assembly 10-CA may not be limited to this embodiment. For example, in other embodiments, when viewed along the main axis 10-AX, the four conductive elements 10-1061 to 10-1064 of the first elastic element 10-106 may be located at four sides of the casing 10-102, and the four connecting members (the first connecting member 10-1051 to the fourth connecting member 10-1054) of the connecting assembly 10-CA can be respectively distributed at the four corners of the casing 10-102.

As shown in FIG. 7, the optical system 10-100 may further include a plurality of circuit boards 10-1141 to 10-1144, which are respectively disposed between the corresponding driving coils and movable members. For example, the circuit board 10-1141 is disposed between the first movable member 10-1081 and the first driving coil 10-CL1.

Figure 8:
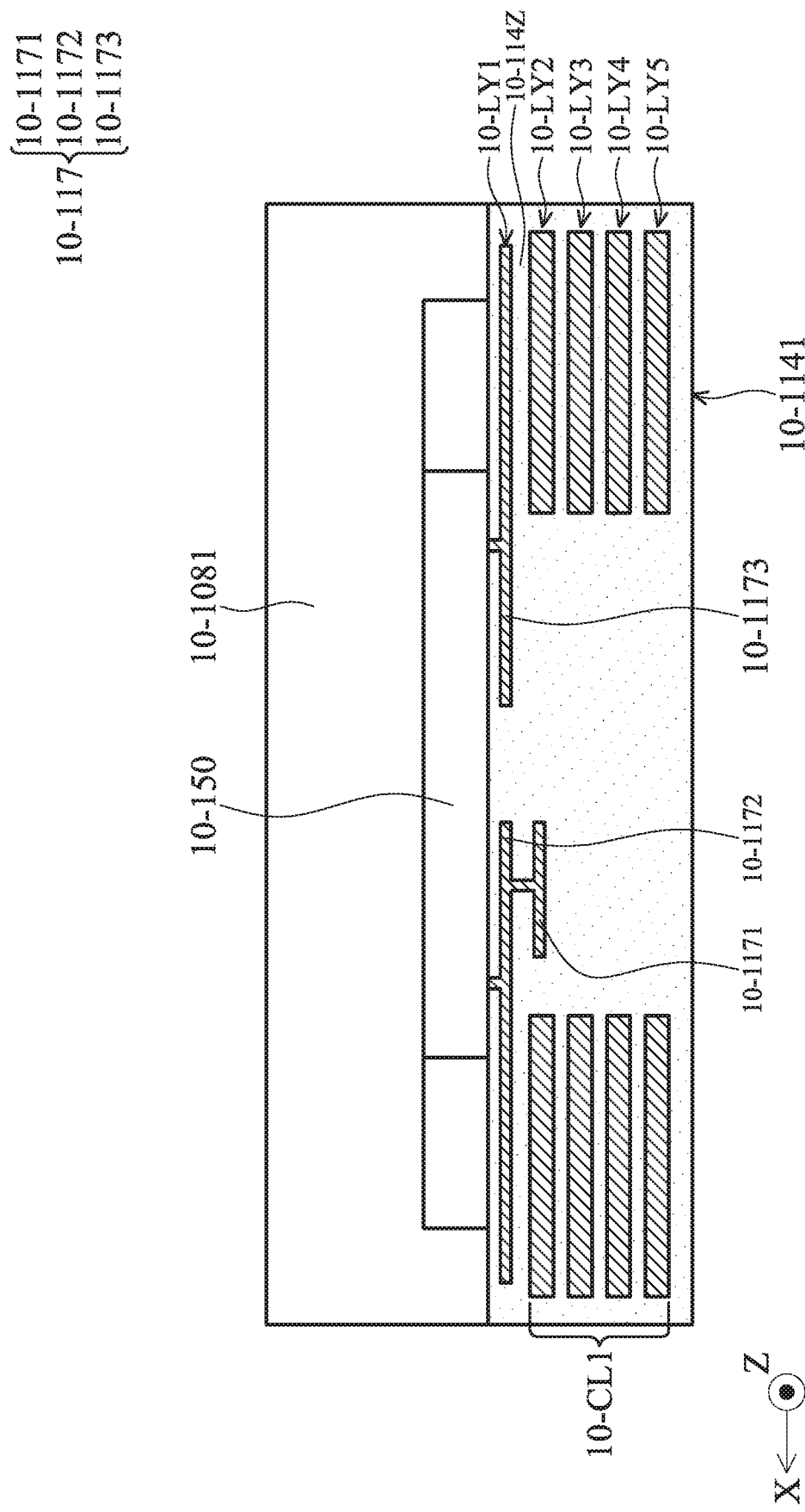
FIG. 8 is a schematic cross-sectional view of the circuit board 10-1141 and the first movable member 10-1081 according to an embodiment of the present disclosure.

Please refer to FIG. 8, which is a schematic cross-sectional view of the circuit board 10-1141 and the first movable member 10-1081 according to an embodiment of the present disclosure. In this embodiment, the circuit board 10-1141 has a plate-shaped structure and is disposed on the first movable member 10-1081. The first driving coil 10-CL1 can be integrated into the circuit board 10-1141, and an electronic component 10-150 may be disposed between the circuit board 10-1141 and the first movable member 10-1081. As shown in FIG. 8, the circuit board 10-1141 includes a coil (the first driving coil 10-CL1) and a circuit line 10-117. The first driving coil 10-CL1 is electrically connected to the electronic components 10-150 by the circuit line 10-117. When viewed in a direction of the circuit board 10-1141 (for example, in the X-axis), the first driving coil 10-CL1 partially overlaps the circuit line 10-117.

In this embodiment, the circuit board 10-1141 has a multilayer structure, for example, it includes a first layer 10-LY1 to a fifth layer 10-LY5, and the first driving coil 10-CL1 is disposed on the second layer 10-LY2 to the fifth layer 10-LY5. As shown in FIG. 8, when viewed in a direction perpendicular to the circuit board 10-1141 (for example, in the Y-axis), the first driving coil 10-CL1 partially overlaps the circuit line 10-117, and the first driving coil 10-CL1 surrounds a first portion 10-1171 of the circuit line 10-117.

As shown in FIG. 8, a portion of the first driving coil 10-CL1 is disposed on the second layer 10-LY2, and the first portion 10-1171 of the circuit line 10-117 is disposed on the second layer 10-LY2. In addition, a second portion 10-1172 of the circuit line 10-117 is disposed on the first layer 10-LY1, and when viewed in a direction of the first layer 10-LY1 (for example, in the X-axis), the circuit line 10-117 on the first layer 10-LY1 does not overlap the first driving coil 10-CL1.

Furthermore, another portion of the first driving coil 10-CL1 is disposed on the third layer 10-LY3, and when viewed in a direction of the third layer 10-LY3 (in the X-axis), the first driving coil 10-CL1 on the third layer 10-LY3 does not overlap the circuit line 10-117.

In addition, the circuit board 10-1141 further includes an insulating layer 10-114Z formed between the first layer 10-LY1 and the second layer 10-LY2, and the insulating layer 10-114Z is in direct contact with the first layer 10-LY1 and the second layer 10-LY2. Specifically, the circuit board 10-1141 may include a plurality of insulating layers 10-114Z, and these insulating layers 10-114Z are integrally formed and cover the circuit line 10-117 and the first driving coil 10-CL1.

Figure 9:
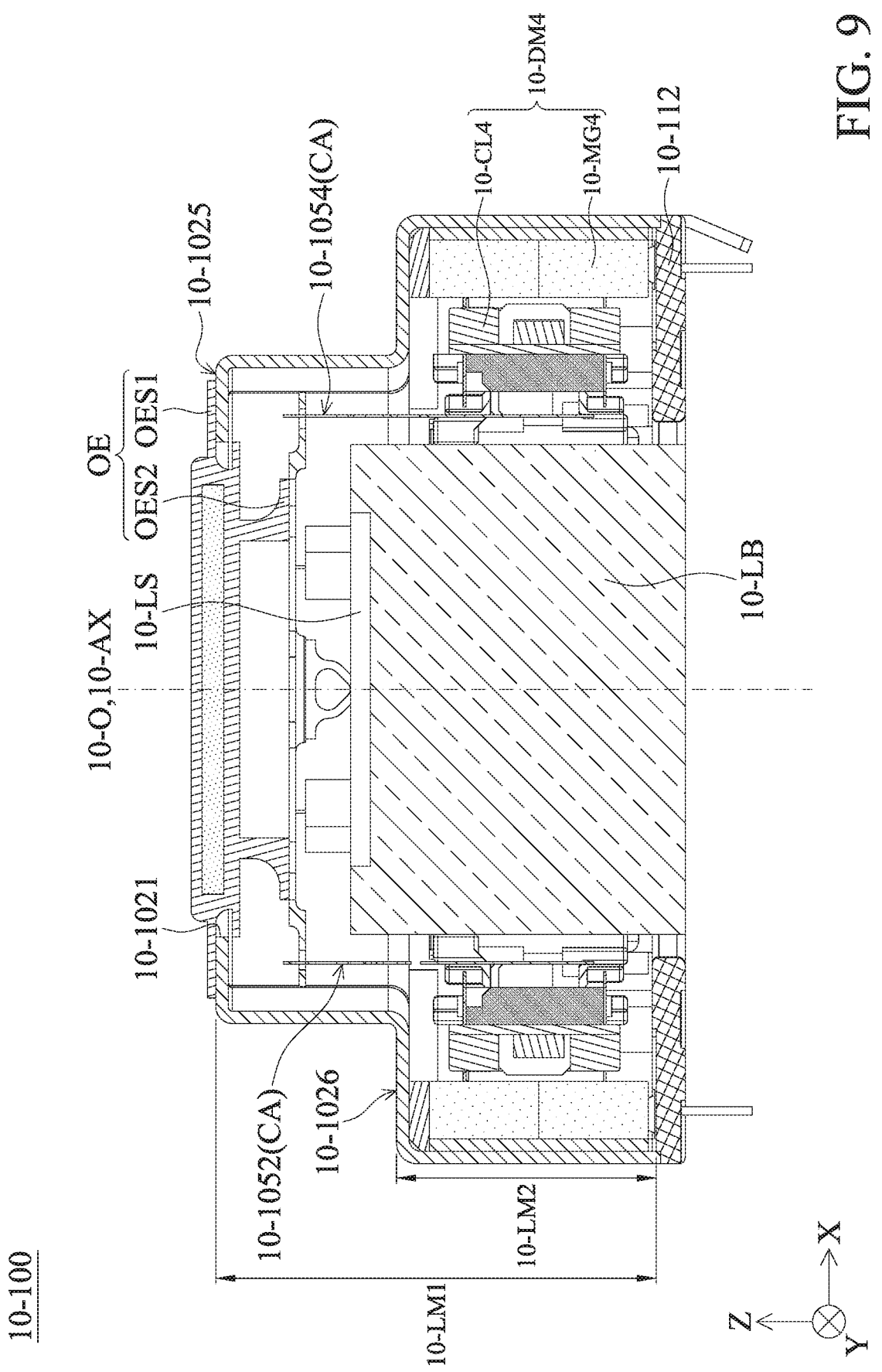
FIG. 9 is a schematic cross-sectional view of the optical system 10-100 according to another embodiment of the present disclosure.

Please continue to refer to FIG. 9, which is a schematic cross-sectional view of the optical system 10-100 according to another embodiment of the present disclosure. In this embodiment, the deforming member 10-101 of the foregoing embodiment and the first optical element 10-OE may be integrally formed in one piece, and the first optical element 10-OE may have a first section 10-OES1 and a second section 10-OES2. When viewed along the main axis 10-AX, the size of the first section 10-OES1 is larger than that of the casing opening 10-102, and the size of the second section 10-OES2 is smaller than that of the casing opening 10-1021.

In addition, in this embodiment, the optical system 10-100 may further include a lens barrel 10-LB, a second optical element 10-LS is disposed in the lens barrel 10-LB, and when viewed along the main axis 10-AX, the effective optical area of the first optical element 10-OE is larger than the effective optical area of the second optical element 10-LS. In other words, the light passage portion of the first optical element 10-OE (the liquid lens) is larger than the light passage portion of the second optical element 10-LS (the general lens).

Furthermore, the casing 10-102 has a first top surface 10-1025 which contacts the first optical element 10-OE, and as shown in FIG. 9, when viewed along the main axis 10-AX, the first top surface 10-1025 does not overlap the driving module 10-DM.

As shown in FIG. 9, the casing opening 10-1021 is located on the first top surface 10-1025 of the casing 10-102 and corresponds to the main axis 10-AX, and the first top surface 10-1025 is not parallel to the main axis 10-AX. For example, the main axis 10-AX is perpendicular to the first top surface 10-1025. When viewed along the main axis 10-AX, the first top surface 10-1025 at least partially overlaps the connecting assembly 10-CA. As shown in FIG. 9, when viewed along the main axis 10-AX, the first top surface 10-1025 at least overlaps the second connecting member 10-1052 and the fourth connecting member 10-1054.

As shown in FIG. 9, the casing 10-102 further includes a second top surface 10-1026, the first top surface 10-1025 and the second top surface 10-1026 are not parallel to the main axis 10-AX, and the first top surface 10-1025 and the second top surface 10-1026 both are back to the base 10-112 (i.e., both face a direction opposite to the base 10-112). Specifically, the shortest distance 10-LM2 between the second top surface 10-1026 and the base 10-112 is smaller than the shortest distance 10-LM1 between the first top surface 10-1025 and the base 10-112.

Figure 10:
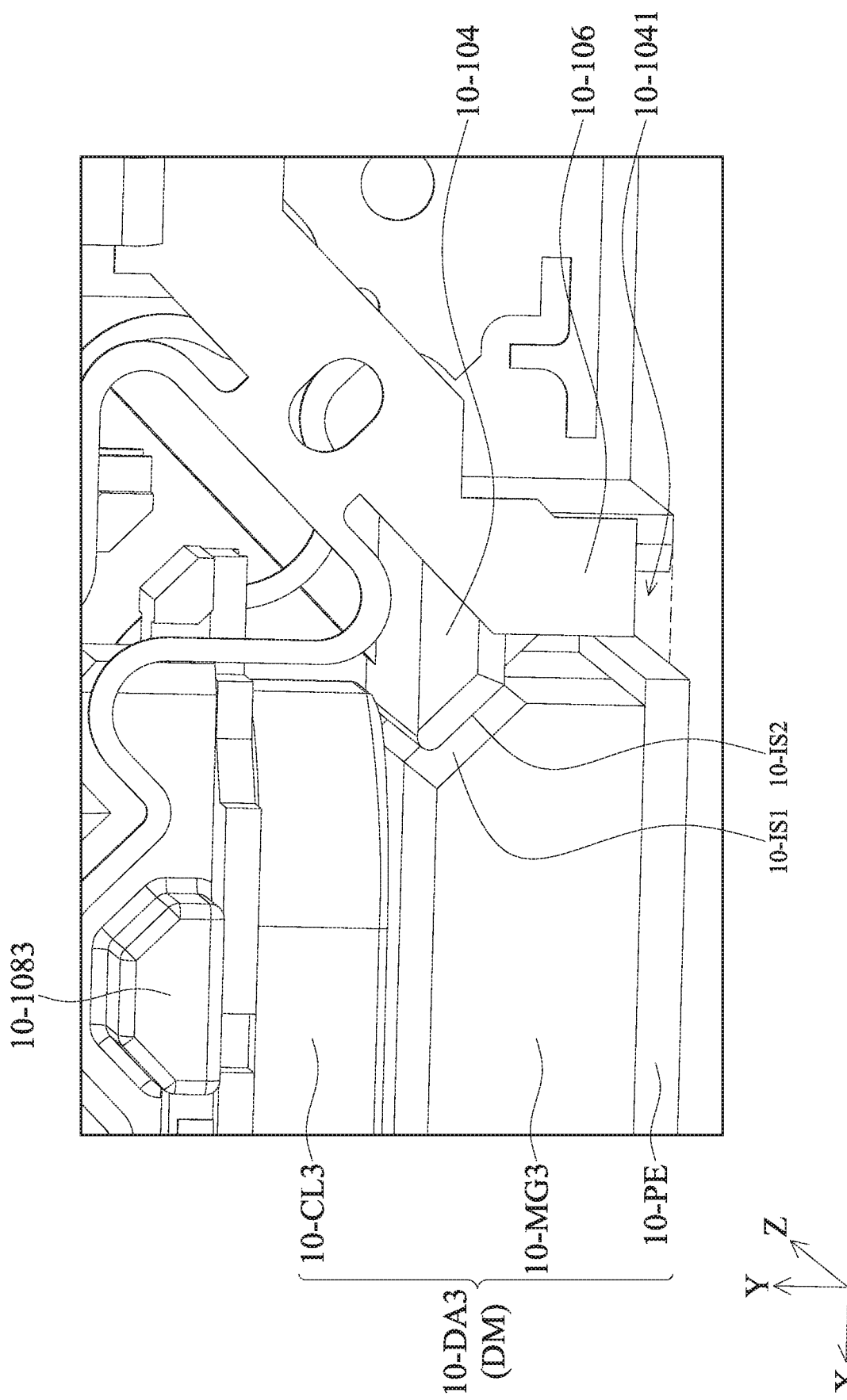
FIG. 10 is a schematic partial structural diagram of the optical system 10-100 according to an embodiment of the present disclosure.

Next, please refer to FIG. 10, which is a schematic partial structural diagram of the optical system 10-100 according to an embodiment of the present disclosure. In this embodiment, each driving assembly of the driving module 10-DM may further include a magnetically permeable element. As shown in FIG. 10, in addition to the third magnetic element 10-MG3 (the driving magnet) and the third driving coil 10-CL3, the third driving assembly 10-DA3 of the driving module 10-DM may further include a magnetically permeable element 10-PE, and the area of the magnetically permeable element 10-PE is larger than that of the third magnetic element 10-MG3.

In addition, as shown in FIG. 10, the third magnetic element 10-MG3 may have an inclined surface 10-IS1, and a stopping slope 10-IS2 is formed on the frame 10-104. The stopping slope 10-IS2 is configured to block the third magnetic element 10-MG3 for preventing the third magnetic element 10-MG3 from colliding with the third driving coil 10-CL3.

Figure 11:
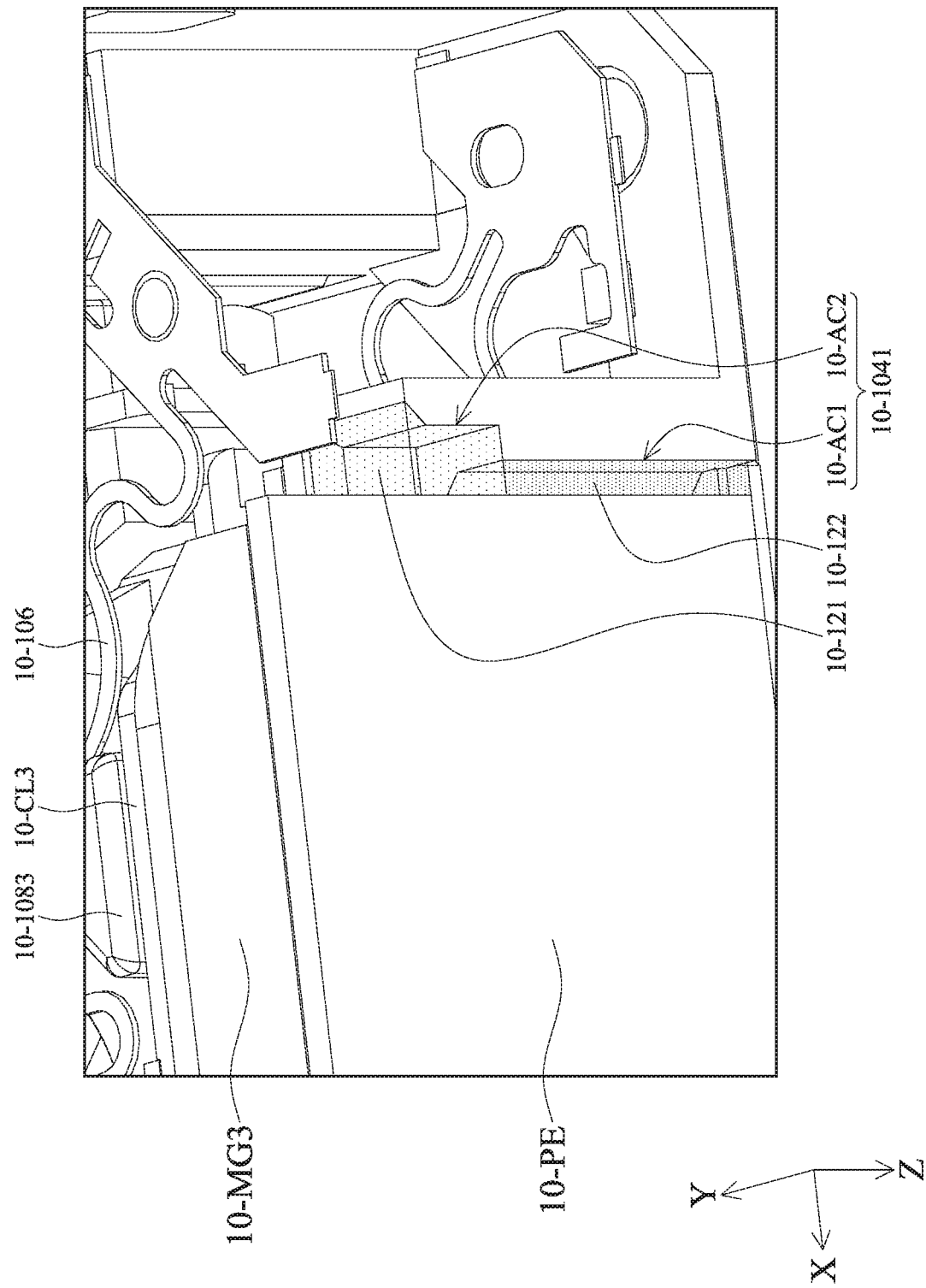
FIG. 11 is a partial structural diagram of the optical system 10-100 from another angle according to an embodiment of the present disclosure.

Next, please refer to FIG. 10 and FIG. 11. FIG. 11 is a partial structural diagram of the optical system 10-100 from another angle according to an embodiment of the present disclosure. As shown in FIG. 10 and FIG. 11, the groove 10-1041 on the frame 10-104 corresponds to the magnetically permeable element 10-PE. Furthermore, in this embodiment, when viewed along the main axis 10-AX (the Z-axis), the groove 10-1041 partially overlaps the magnetically permeable element 10-PE. That is, in the Y-axis, a portion of the magnetically permeable element 10-PE is located outside the groove 10-1041.

As shown in FIG. 11, the groove 10-1041 has a first accommodating portion 10-AC1 and a second accommodating portion 10-AC2, and there is a step between the first accommodating portion 10-AC1 and the second accommodation portion 10-AC2. In this embodiment, a first adhesive element 10-121 can be disposed in the first accommodating portion 10-AC1, and a second adhesive element 10-122 can be disposed in the second accommodating portion 10-AC2. The first adhesive element 10-121 and the second adhesive element 10-122 are configured to adhere the third magnetic element 10-MG3 and the magnetically permeable element 10-PE to the frame 10-104, and the aforementioned first adhesive element 10-121 and the second adhesive element 10-122 include different materials. For example, one of them may be UV glue, and the other one may be thermosetting glue.

Figure 12:
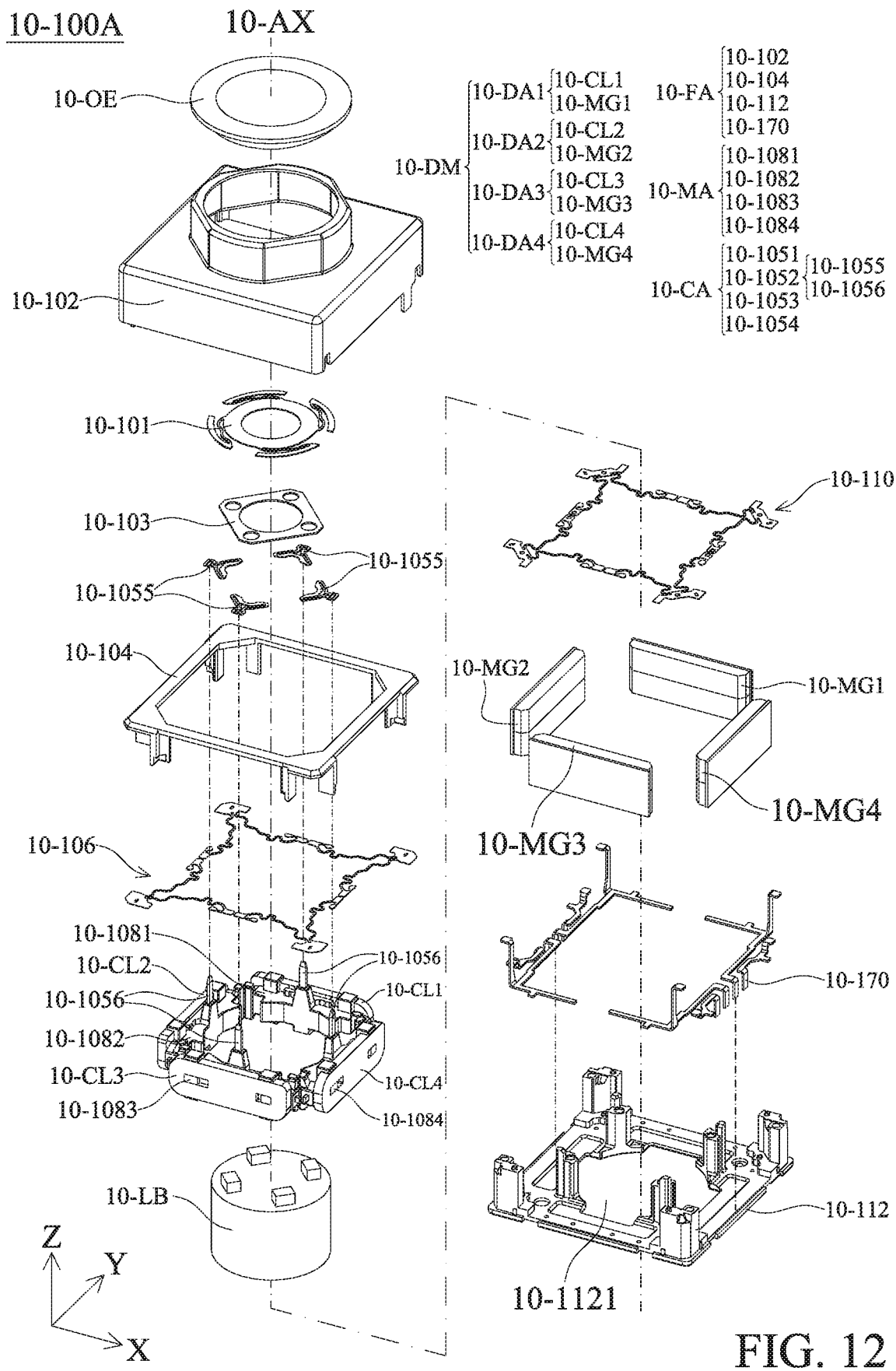
FIG. 12 is an exploded diagram of an optical system 10-100A according to another embodiment of the present disclosure.
Figure 13:
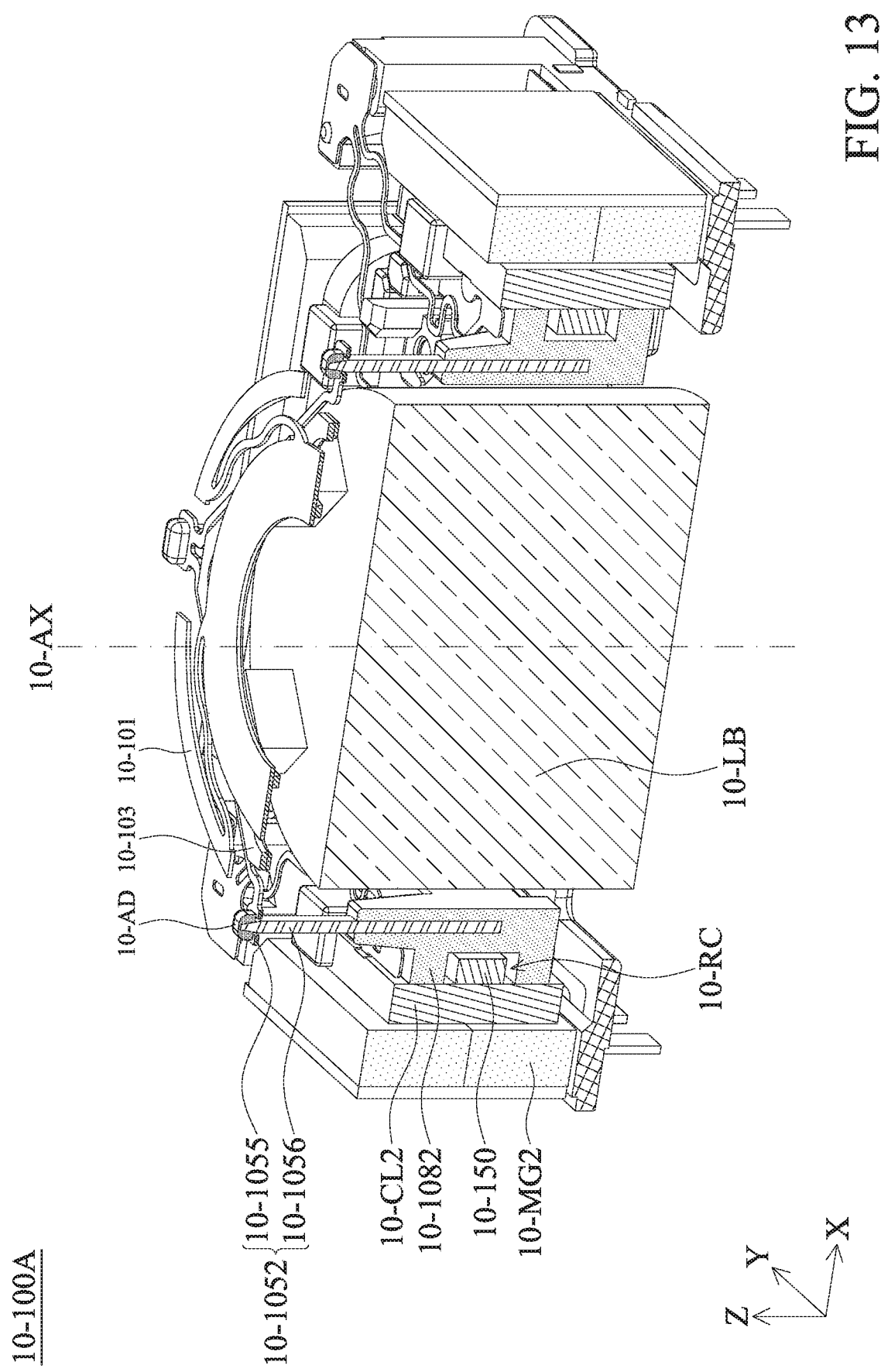
FIG. 13 is a partial structural diagram of the optical system 10-100A according to another embodiment of the present disclosure.

Please refer to FIG. 12 and FIG. 13. FIG. 12 is an exploded diagram of an optical system 10-100A according to another embodiment of the present disclosure, and FIG. 13 is a partial structural diagram of the optical system 10-100A according to another embodiment of the present disclosure. The optical system 10-100A is similar to the optical system 10-100. In this embodiment, the connecting assembly 10-CA of the optical system 10-100A also includes four connecting members, and each connecting member may have an elastic portion and a rigid portion.

As shown in FIG. 12 and FIG. 13, the second connecting member 10-1052 has an elastic portion 10-1055 and a rigid portion 10-1056. The elastic portion 10-1055 may have a plate-shaped structure and is not parallel to the main axis 10-AX, for example, perpendicular to the main axis 10-AX, and the rigid portion 10-1056 is connected to the elastic portion 10-1055 by an adhesive member 10-AD. The rigid portion 10-1056 is connected between the elastic portion 10-1055 and the second movable member 10-1082.

Furthermore, the second driving coil 10-CL2 is disposed on the second movable member 10-1082 of the movable assembly 10-MA, an accommodating recess 10-RC is formed between the second driving coil 10-CL2 and the second movable member 10-1082, and the optical system 10-100A further includes an electronic component 10-150 (such as a control unit or a sensor) which is disposed in the accommodating recess 10-RC. Based on the above design, the electronic component 10-150 can be protected from collision and damage.

Figure 14:
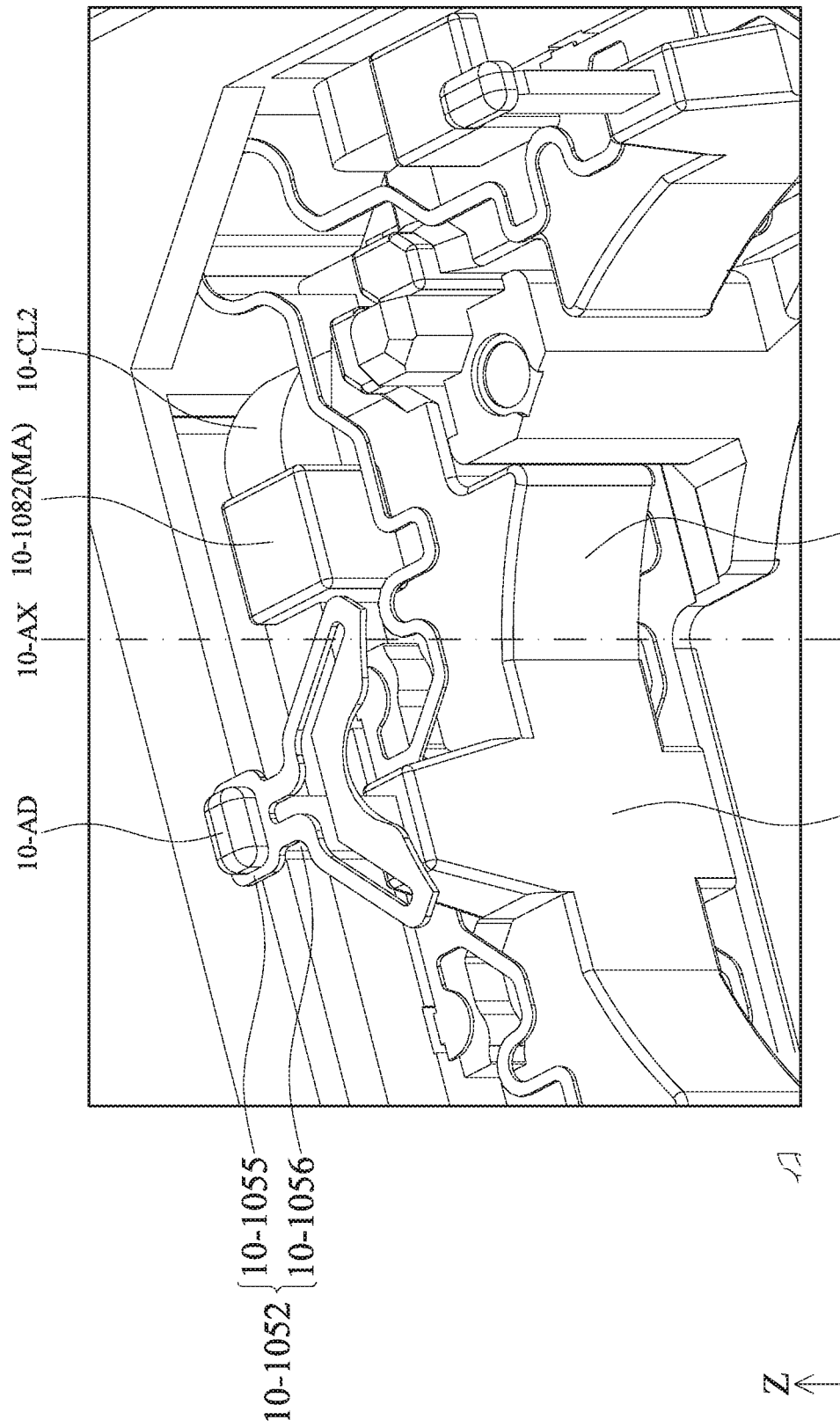
FIG. 14 is a partial structural diagram of the optical system 10-100A according to another embodiment of the present disclosure.

Please refer to FIG. 14, which is a partial structural diagram of the optical system 10-100A according to another embodiment of the present disclosure. As shown in FIG. 14, the second movable member 10-1082 of the movable assembly 10-MA has a plane 10-108N and a curved surface 10-108C, facing the main axis 10-AX. Based on this structural design, the mechanical strength of the movable assembly 10-MA can be increased, and a larger size lens barrel 10-LB can be accommodated.

Figure 15:
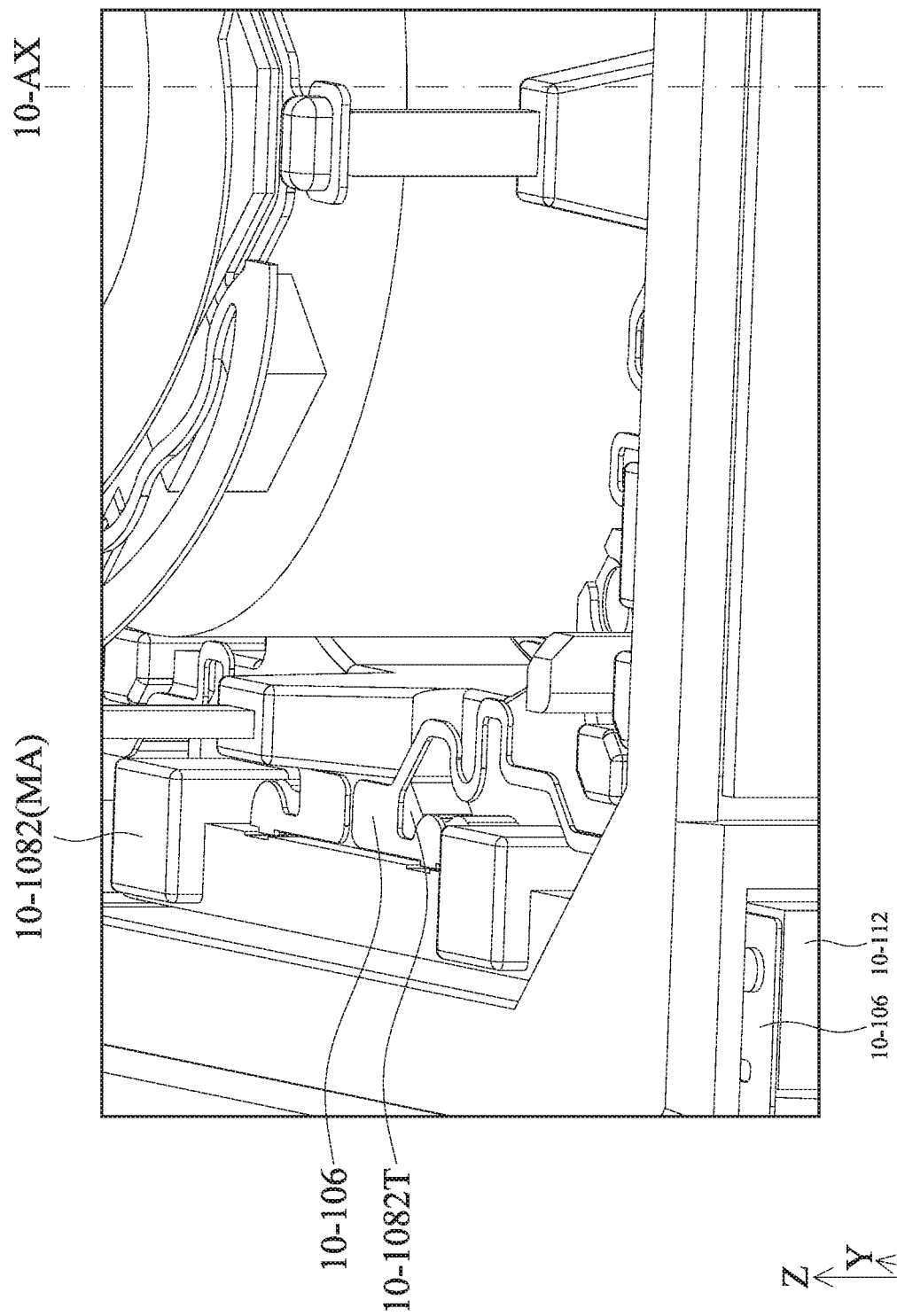
FIG. 15 is a partial structural diagram of an optical system 10-100A according to another embodiment of the present disclosure.
Figure 16:
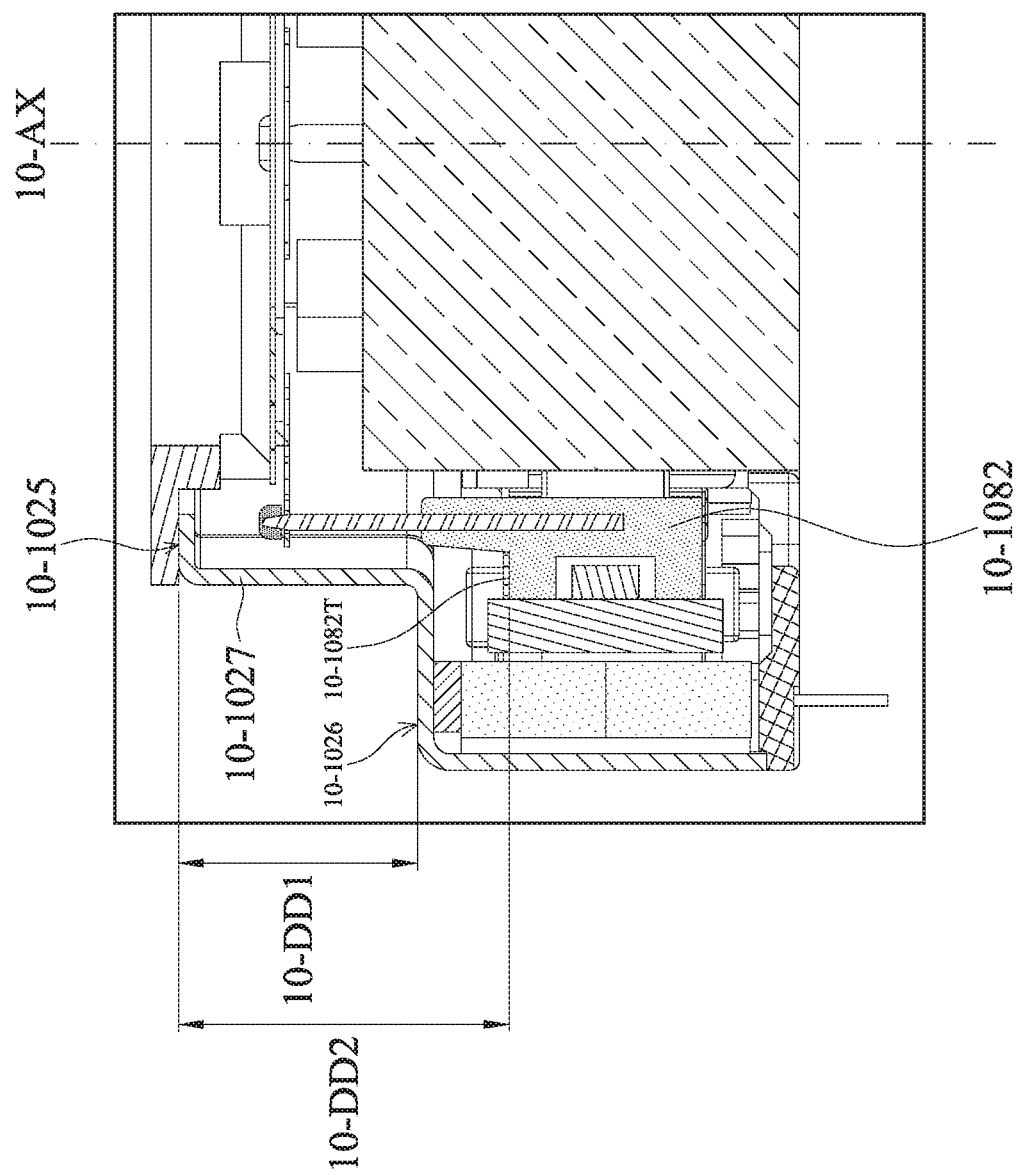
FIG. 16 is a cross-sectional view of a partial structure of the optical system 10-100A according to another embodiment of the present disclosure.

Please refer to FIG. 15 and FIG. 16. FIG. 15 is a partial structural diagram of an optical system 10-100A according to another embodiment of the present disclosure, and FIG. 16 is a cross-sectional view of a partial structure of the optical system 10-100A according to another embodiment of the present disclosure. As shown in FIG. 15 and FIG. 16, the second movable member 10-1082 of the movable assembly 10-MA has a movable assembly surface 10-1082T, and the movable assembly surface 10-1082T is movably connected to the base 10-112 through the first elastic element 10-106. In addition, along the main axis 10-AX, a distance 10-DD1 between the first top surface 10-1025 and the second top surface 10-1026 of the casing 10-102 is shorter than a distance 10-DD2 between the movable assembly surface 10-1082T and the first top surface 10-1025. That is, the movable assembly surface 10-1082T is not in contact with the casing 10-102.

Furthermore, the casing 10-102 further has a side wall 10-1027 connected between the first top surface 10-1025 and the second top surface 10-1026. When viewed along the main axis 10-AX, the side wall 10-1027 partially overlaps the second movable member 10-1082. Based on the design of the casing 10-102 of the present disclosure, the purposes of protecting the movable assembly 10-MA, accommodating a longer lens barrel 10-LB, and miniaturization can be achieved.

The present disclosure provides an optical system having a first optical element 10-OE, a deforming member 10-101, a movable element 10-103, a fixed assembly 10-FA, a connecting assembly 10-CA, a movable assembly 10-MA, and a driving module 10-DM. The movable element 10-103 is configured to be connected to the first optical element 10-OE through the deforming member 10-101, and the movable assembly 10-MA is connected to the movable element 10-103 through the connecting assembly 10-CA. When driving module 10-DM is configured to drive movable assembly 10-MA to move relative to fixed assembly 10-FA, the movable element 10-103 can be moved to drive the deforming member 10-101 to push the bottom of first optical element 10-OE, thereby changing the optical properties of the liquid lens element 10-OE1.

In addition, in some embodiments, the magnetic element is disposed in the groove 10-1041 of the frame 10-104. A stopping slope 10-IS2 is formed on the frame 10-104. The stopping slope 10-IS2 is configured to block the inclined surface 10-IS1 of the magnetic element for preventing the magnetic element from colliding with the corresponding driving coil and causing the driving coil to be damaged. The groove 10-1041 can have a first accommodating portion 10-AC1 and a second accommodating portion 10-AC2, and a first adhesive element 10-121 and a second adhesive element 10-122 can be respectively disposed in the first accommodating portion 10-AC1 and the second accommodating portion 10-AC2 so as to adhere the third magnetic element 10-MG3 and the magnetically permeable element 10-PE to the frame 10-104. In addition, the aforementioned first adhesive element 10-121 and the second adhesive element 10-122 include different materials.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:
1. An optical system, comprising:
a fixed assembly, defining a main axis, wherein the fixed assembly includes a casing on which a casing opening is formed, and the casing opening corresponds to the main axis;
a movable element, movable relative to the fixed assembly and connected to a first optical element;
a movable assembly, connected to the movable element; and a driving module, configured to drive the movable assembly so as to drive the movable element to move relative to the fixed assembly;

wherein the optical system further includes a connecting assembly, and the movable element is connected to the movable assembly by the connecting assembly;

wherein the first optical element, the movable element, the connecting assembly, and the movable assembly are arranged along the main axis in sequence;

wherein the movable assembly includes a plurality of movable members, the driving module includes a plurality of driving assemblies, and the driving assemblies are configured to generate an electromagnetic driving force to drive the movable members to move relative to the fixed assembly along the main axis individually or cooperatively;

wherein the driving module includes a driving magnet and a magnetically permeable element, and an area of the magnetically permeable element is larger than an area of the driving magnet;

wherein the fixed assembly includes a frame, a groove corresponding to the magnetically permeable element is formed on the frame, and when viewed along the main axis, the groove partially overlaps the magnetically permeable element; and wherein the driving magnet has an inclined surface, and a stopping slope is formed on the frame configured to block the driving magnet.

2. The optical system as claimed in claim 1, wherein the groove has a first accommodating portion and a second accommodating portion, and there is a step between the first accommodating portion and the second accommodation portion.

3. The optical system as claimed in claim 2, wherein a first adhesive element is disposed in the first accommodating portion, a second adhesive element is disposed in the second accommodating portion, and the first adhesive element and the second adhesive element include different materials.

4. The optical system as claimed in claim 1, wherein the driving module further includes a driving coil disposed on the movable assembly, an accommodating recess is formed between the driving coil and the movable assembly, and the optical system further includes an electronic component which is disposed in the accommodating recess.

5. The optical system as claimed in claim 1, wherein the casing has a first top surface which contacts the first optical element, and when viewed along the main axis, the first top surface does not overlap the driving module.

6. The optical system as claimed in claim 1, wherein the optical system further includes a second optical element, and when viewed along the main axis, an effective optical area of the first optical element is larger than an effective optical area of the second optical element.

7. The optical system as claimed in claim 1, wherein the movable assembly has a plane and a curved surface which face the main axis.

8. The optical system as claimed in claim 1, wherein the driving module includes a circuit board having a plate-shaped structure, the circuit board includes a coil and a circuit line, and when viewed in a direction of the circuit board, the coil partially overlaps the circuit line.

9. The optical system as claimed in claim 8, wherein when viewed in a direction perpendicular to the circuit board, the coil surrounds a first portion of the circuit line.

10. The optical system as claimed in claim 9, wherein the circuit board includes a first layer and a second layer, a portion of the coil is disposed on the second layer, and the first portion of the circuit line is disposed on the second layer.

11. The optical system as claimed in claim 10, wherein a second portion of the circuit line is disposed on the first layer, and when viewed in a direction of the first layer, the circuit line does not overlap the coil.

12. The optical system as claimed in claim 11, wherein the circuit board further includes a third layer, a portion of the coil is disposed on the third layer, and when viewed in a direction of the third layer, the coil does not overlap the circuit line.

13. The optical system as claimed in claim 12, wherein when viewed in the direction perpendicular to the circuit board, the coil partially overlaps the circuit line.

14. The optical system as claimed in claim 10, wherein the circuit board further includes an insulating layer formed between the first layer and the second layer, and the insulating layer is in direct contact with the first layer and the second layer.

15. The optical system as claimed in claim 1, wherein the casing opening is located on a first top surface of the casing, the first top surface is not parallel to the main axis, when viewed along the main axis, the first top surface at least partially overlaps the connecting assembly.

16. The optical system as claimed in claim 15, wherein the optical system further includes an elastic element, when viewed along the main axis, the elastic element is located in a plurality of corners of the casing having a polygonal structure, and the connecting assembly includes a plurality of connecting members which are respectively distributed between the corners.

17. The optical system as claimed in claim 15, wherein the optical system further includes an elastic element, when viewed along the main axis, the elastic element is located at a plurality of sides of the casing having a polygonal structure, and the connecting assembly includes a plurality of connecting members which are distributed in the respective corners of the casing.

18. The optical system as claimed in claim 1, wherein the fixed assembly further includes a base, the casing further includes a first top surface and a second top surface, the first top surface and the second top surface are not parallel to the main axis, the first top surface and the second top surface both are back to the base, and a shortest distance between the second top surface and the base is smaller than a shortest distance between the first top surface and the base.

19. The optical system as claimed in claim 18, wherein the optical system further includes an elastic element, a movable assembly surface of the movable assembly is movably connected to the fixed assembly through the elastic element, and a distance between the first top surface and the second top surface along the main axis is shorter than a distance between the movable assembly surface and the first top surface.

* * * * *